(12) United States Patent
Beetz et al.

(10) Patent No.: US 10,396,616 B2
(45) Date of Patent: Aug. 27, 2019

(54) ELECTRIC MOTOR AND SWITCHING UNIT THEREFOR

(71) Applicant: BROSE FAHRZEUGTEILE GMBH & CO. KOMMANDITGESELLSCHAFT, WUERZBURG, Wuerzburg (DE)

(72) Inventors: Stefan Beetz, Barnin (DE); Maurad Berkouk, Le Conquet (FR); Sylvain Cordrie, Estenfeld (DE); Dominik Jaeger, Bermbach (DE); Sebastien Labat, Schwanfeld (DE); Stanley Simpson, Oxford, MI (US)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 15/667,813

(22) Filed: Aug. 3, 2017

(65) Prior Publication Data
US 2017/0331342 A1 Nov. 16, 2017

Related U.S. Application Data

(63) Continuation of application No. PCT/EP2016/052267, filed on Feb. 3, 2016.

(30) Foreign Application Priority Data

Feb. 3, 2015 (DE) .......................... 10 2015 001 214

(51) Int. Cl.
*H02K 5/08* (2006.01)
*H02K 11/33* (2016.01)
(Continued)

(52) U.S. Cl.
CPC ............ *H02K 3/522* (2013.01); *H01R 4/2429* (2013.01); *H02K 5/08* (2013.01); *H02K 11/33* (2016.01);
(Continued)

(58) Field of Classification Search
CPC .......... H02K 3/52; H02K 3/522; H02K 3/525; H02K 5/08; H02K 11/33; H02K 2203/06;
(Continued)

(56) References Cited

U.S. PATENT DOCUMENTS 5,533,910 A * 7/1996 Korner .................. H01R 4/242
439/395
6,123,566 A 9/2000 Daoud et al.
(Continued)

FOREIGN PATENT DOCUMENTS

CN 1823461 A 8/2006
CN 101682225 A 3/2010
(Continued)

*Primary Examiner* — Quyen P Leung
*Assistant Examiner* — Alexander A Singh
(74) *Attorney, Agent, or Firm* — Laurence A. Greenberg; Werner H. Stemer; Ralph E. Locher

(57) ABSTRACT

An electric motor has a switching unit with a number of contact wires and an annular frame part. The contact wires are arranged to form an interconnect ring for the coil ends of a stator winding and the ends of the wires being connected by insulation displacement contacts. Each of the contacts have two insulation displacement limbs for connecting at least two of the wire ends, the limbs being spaced apart, thus forming an insulation displacement slot therebetween. The frame part of the switching unit has a number of plug-in pockets for receiving the insulation displacement contacts, the number corresponding to the number of insulation displacement contacts.

8 Claims, 8 Drawing Sheets

(51) Int. Cl.
*H02K 3/52* (2006.01)
*H01R 4/2429* (2018.01)

(52) U.S. Cl.
CPC ..... *H02K 2203/03* (2013.01); *H02K 2203/06* (2013.01); *H02K 2203/09* (2013.01)

(58) Field of Classification Search
CPC ........... H02K 2203/09; H02K 2203/03; H01R 4/2429; H01R 4/2416; H01R 11/12; H01R 13/112
USPC .......................................................... 310/71
See application file for complete search history.

(56) References Cited

U.S. PATENT DOCUMENTS

| | | |
|---|---|---|
| 6,707,186 B2 | 3/2004 | Oppitz |
| 7,262,529 B2 | 8/2007 | Klappenbach et al. |
| 7,948,130 B2 | 5/2011 | Kitagawa |
| 9,119,324 B2 | 8/2015 | Kifer et al. |
| 9,948,154 B2 | 4/2018 | Böhm et al. |
| 2002/0055294 A1* | 5/2002 | Murakami ........... H01R 13/112 439/395 |
| 2003/0173854 A1* | 9/2003 | Oppitz ................... H02K 3/522 310/184 |
| 2005/0088049 A1 | 4/2005 | De Filippis et al. |
| 2007/0114861 A1* | 5/2007 | Bott ..................... B65G 13/075 310/71 |
| 2010/0064502 A1 | 3/2010 | Chen |
| 2010/0068916 A1* | 3/2010 | Chen ................... H01R 4/2429 439/391 |
| 2010/0141067 A1 | 6/2010 | Kitagawa |
| 2011/0057524 A1 | 3/2011 | Andrieux et al. |
| 2016/0099623 A1* | 4/2016 | Bohm .................... H02K 3/28 310/43 |

FOREIGN PATENT DOCUMENTS

| | | |
|---|---|---|
| CN | 201508940 U | 6/2010 |
| DE | 10152006 A1 | 5/2003 |
| DE | 10261611 A1 | 7/2004 |
| DE | 102008033905 A1 | 1/2010 |
| DE | 102009036128 A1 | 2/2011 |
| DE | 102014220201 A1 | 4/2016 |
| EP | 2712029 A1 | 3/2014 |
| JP | 2003143793 A | 5/2003 |
| JP | 2006296147 A | 10/2006 |

\* cited by examiner

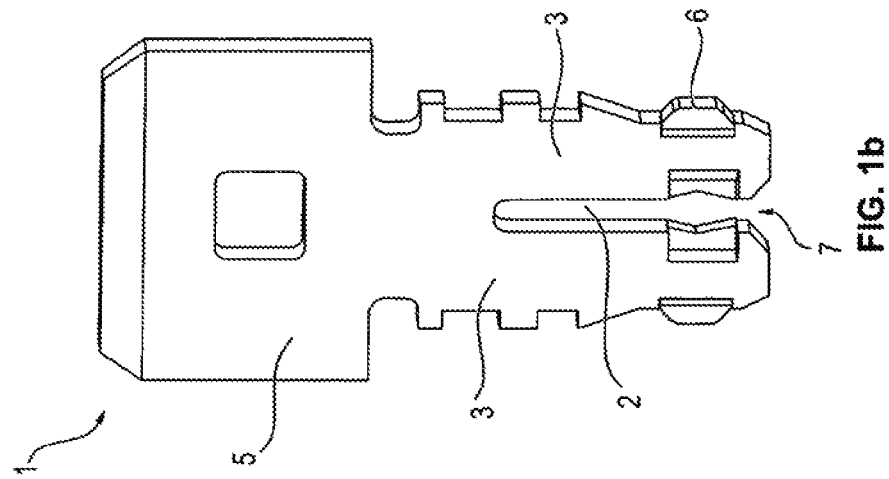
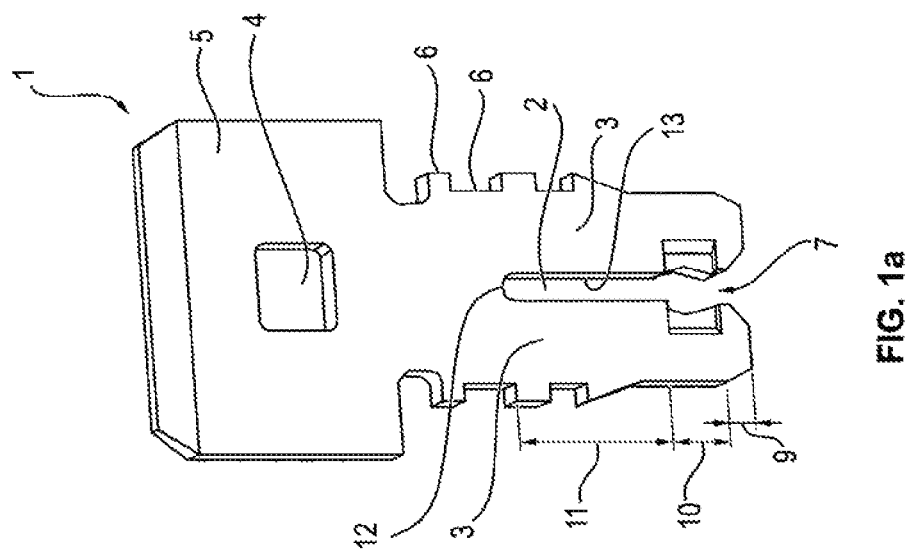

ELECTRIC MOTOR AND SWITCHING UNIT THEREFOR

CROSS-REFERENCE TO RELATED APPLICATION

This application is a continuation, under 35 U.S.C. § 120, of copending international application No. PCT/EP2016/052267, filed Feb. 3, 2016, which designated the United States; this application also claims the priority, under 35 U.S.C. § 119, of German patent application No. DE 10 2015 001 214.2, filed Feb. 3, 2015; the prior applications are herewith incorporated by reference in their entirety.

BACKGROUND OF THE INVENTION

Field of the Invention

The invention relates to an electric motor, in particular to a radiator fan motor of a motor vehicle, containing a switching unit for the coil ends of a motor or stator winding of the electric motor. The invention further relates to a switching unit of this kind.

A brushless electric motor has a stator with a number of stator teeth which are, for example, arranged in star and are fitted with an electrical stator winding (motor winding) in the form of individual stator coils which, for their part, are wound to form an insulating wire. The coils, by way of their coil ends, are associated with individual phases and are interconnected in a predetermined manner by connecting conductors of a switching unit.

In the case of a brushless electric motor as a three-phase machine, the stator has three phases and therefore at least three connecting conductors to each of which electric current is applied in a phase-offset manner in order to generate a magnetic rotating field in which a rotor, which is usually provided with permanent magnets, rotates. The connecting conductors are routed to a motor electronics system for driving the electric motor. The coils of the stator winding are interconnected in a specific manner by the connecting conductors. The manner of interconnection is determined by the winding diagram of the stator winding, wherein a star connection or a delta connection of the coils is the usual winding scheme.

U.S. patent publication No. 2011/0057524 A1 discloses an electrical plug connector arrangement for a brushless electromagnetic motor. The brushless electromagnetic motor contains a three-phase stator winding with a number of windings per phase which are interconnected either in parallel or in series. The plug connector arrangement contains an annular wire conducting element for receiving the ends of the windings and also a connecting receptacle in the form of three annular connecting rails which each have a cable shoe as terminal. In addition, the connecting rails have axially widened wire terminals for ensuring electrical contact for the three phases through the slots of the wire guiding element.

U.S. patent application No. 2005/0088049 A1 discloses a stator for an electric motor having an annular stator core with a plurality of stator teeth. An annular connecting unit is fitted to an end side of the stator. The annular connecting unit contains deflection elements and a supporting element which is equipped with a receptacle and slots. A series of connecting rings which are insulated from one another and each of which has contact elements which are guided to the outside through the slots are located in the receptacle.

Published, non-prosecuted German patent application DE 10 2009 036 128 A1 (corresponding to U.S. Pat. No. 9,119,324) discloses an electric motor having a stator with twelve stator windings, some of which are interconnected in series and ultimately to form a star connection. A supporting element and a conductor track structure containing four wires, which are received by the supporting element by the wires being clipped into the supporting element, are provided for interconnection purposes. The wires form a complete ring or partial ring sections, wherein a wire of this kind as a complete ring, in conjunction with the coil ends of the stator windings, forms the star connection. The supporting element has axial guides for the coil ends, wherein the electrical connection between the coil ends and the respective wires is established by soldering, welding or hot-caulking.

Circuit units containing contact wires which consist of round wire for connecting and making contact with the coil ends are known from U.S. Pat. No. 7,948,130 B2 and from published, non-prosecuted German patent application DE 102 61 611 A1 (corresponding to U.S. Pat. No. 7,262,529). In the case of contact wires which consist of round wire, it is problematical to make contact with the coil ends by customary resistance welding since, on account of the round wire cross sections both of the coil ends and also of the respective contact wire, these the wires involved tend to tilt in the event of welding by means of smooth or planar electrodes. Tilting of the wires in this way leads to an undesirably high level of waste on account of frequent faulty welding operations.

SUMMARY OF THE INVENTION

The invention is therefore based on the object of specifying an electric motor containing a switching unit which is particularly suitable for connecting and making contact with the winding coils in a simple and reliable manner. A further object is to specify a switching unit with a number of contact wires, which are preferably arranged in an annular manner to form an interconnection ring, for interconnecting the coils, the wire ends of said contact wires being electrically conductively connectable or connected to one another and/or to phase connections of the motor winding in a particularly suitable manner.

To this end, the electric motor has a switching unit with a number of contact wires and with an annular frame part with a number of slotted insertion pockets. In this case, the contact wires are arranged to form an interconnection ring for the coil ends of a stator winding. The wire ends of the contact wires (copper wires), which are preferably provided with an insulating sheathing (insulation), are connected to insulation-displacement contacts, that is to say are electrically conductively contact-connected to one another. The or each insulation-displacement contact has two insulation-displacement limbs, which are spaced apart from one another so as to form an insulation-displacement slot with a free end-side slot opening, for connecting in each case at least two of the wire ends, wherein the insulation-displacement contacts are seated in insertion pockets of the frame part of the switching unit in the assembled state. To this end, the respective insertion pocket of the frame part suitably has a slot which is in alignment with the insulation-displacement slot of the insulation-displacement contact which is inserted into the insertion pocket. The slot of the insulation-displacement contact and the frame part-side insertion pockets expediently run axially, that is to say in the axial direction with respect to the assembled state of the electric motor.

An insulation-displacement contact is usually a connecting element for the purpose of connecting a plug element to a wire, for example even a wire which is provided with insulation. An insulation-displacement contact of this kind is usually provided and configured for making insulation-displacement contact with an individual wire.

However, the insulation-displacement contact according to the invention is configured for connecting two or more wires (copper wires) to form a permanent connection. Therefore, in an advantageous refinement, the insulation-displacement slot and/or the insulation-displacement limbs of the insulation-displacement contact are configured in such a way that the at least two wire ends, which are introduced into the insulation-displacement slot one behind the other in the slot longitudinal direction and which are guided along at least one limb-side blade edge there, are in reliable clamping contact.

According to an expedient development, it is provided that the insulation-displacement slot of the or each insulation-displacement contact has, in the slot longitudinal direction, a first slot region which adjoins a limb free end-side slot opening and has a second slot region which adjoins said first slot region and is widened, in particular in the shape of a diamond or rhombus. The or each limb of the respective insulation-displacement contact suitably has, on the outside of the limb, at least one raised joining contour.

In addition or as an alternative, a suitable refinement provides that the insulation-displacement slot of the or each insulation-displacement contact has a, preferably circular, recess contour, which forms a predetermined bending point for the insulation-displacement limb, in a slot end region which is averted from a limb free end-side slot opening in the slot longitudinal direction.

According to one expedient development of this predetermined bending point of the insulation-displacement limbs, the recess contour forms an abutment contour which narrows the insulation-displacement slot and against which the wire end introduced first into the insulation-displacement slot stops. The wire end then virtually forms the stop for the second wire end introduced into the insulation-displacement slot.

In respect of the switching unit for a, preferably brushless, electric motor of this kind with a number of contact wires for interconnecting coils of a stator or motor winding, the insulation-displacement contacts suitably form a corresponding number of phase connections, for example three phase connections in the case of a three-phase electric motor or a three-phase motor winding. In this case, the connections of the wire ends of the contact wires which are preferably arranged to form an interconnection ring, which connections are established by the insulation-displacement contacts, are also employed or used for the phase connections of a multiple-phase motor or stator winding.

The insulation-displacement contact has two limbs (insulation-displacement limbs). A slot (insulation-displacement slot) is formed between the limbs, the slot being open at the limb free ends and being closed at the opposite limb ends. The limb edges which are situated opposite one another are formed in such a way that a wire (conductor) which is introduced into the slot from the slot opening is cut and/or nicked (on the circumference) at the limb edges (called blade edges in the text which follows) and in the process the wire insulation is severed. In the process, the flexible limbs exert a spring-like clamping force on the respective wire (the respective wire end). In the insulation-displacement state of the wire or wire end, the blade edges of the insulation-displacement limbs run virtually tangentially to the usually approximately circular wire diameter.

In this case, the cutting or blade edges and/or the slot geometry of the insulation-displacement contact is such that both a first and also at least one second wire (wire end) are in reliable clamping contact in the insulation-displacement slot of the same insulation-displacement contact in the slot longitudinal direction.

In particular, a specific, prespecified and/or selected ratio of cut depth of the wire (wire end) to the wire initially diameter is established by means of the blade edge arrangement and/or contour. In this case, the geometry or blade edge contour and/or slot geometry is such that firstly a first wire (wire end) is pushed into the insulation-displacement contact when contact is made and is cut at the blade edge or the two blade edges which flank the slot. In this case, the wire is oriented normally to the slot plane of the insulation-displacement contact. In the region of the insulation-displacement edges, the wire diameter is reduced by, for example, 20% to 25%, while the wire which is cut when subsequent contact is made is cut by a smaller amount of, for example, 10% to <20% in respect of its wire diameter in the region of the cutting edges. In this case, the or each wire is oriented normally to the slot plane of the insulation-displacement contact.

In a particularly advantageous refinement, the slot geometry is such that, starting from the slot opening, the slot opening is adjoined firstly by a, preferably comparatively short, first cutting region and the cutting region is adjoined by an extended second region and the second region is in turn adjoined by a, preferably comparatively long, third cutting region. The widened region is, for example, diamond-shaped owing to an approximately V-shaped notch being made in the two opposite limbs in each case. Since the insulation-displacement contact is preferably a stamped part, both this geometry and also another geometry or contour which represents the widened region are feasible. The facing edges of the limbs do not necessarily have to be designed as blade edges in the widened region.

Local raised contours are preferably suitably integrally formed on the outside of the insulation-displacement limbs opposite this widened region. In addition, further joining contours (pegs and/or grooves) are expediently integrally formed or punched along the outside of the insulation-displacement limbs.

The widened region of the slot has the advantageous purpose and the suitable function of receiving the wire cut in the slot (first wire) as soon as the further (second) wire enters the comparatively short or narrow cutting region, which adjoins the insertion opening of the slot, between the blade edges of the limbs which are arranged opposite one another. Since the first wire is located in the widened region of the slot in this position, the required insulation-displacement forces of the two limbs act on the second wire in the cutting region which is upstream of the slot opening. In this way, the two wires are cut in succession and can then be guided further or pushed further in the slot longitudinal direction with clamping contact over the widened region in the adjoining insulation-displacement region which acts, in particular, as a clamping region.

According to a further advantageous refinement, the insulation-displacement contact interacts with a receiving pocket which is matched to the outer contour of the insulation-displacement contact, in particular in the region of the limbs of the insulation-displacement contact. The receiving pocket is suitably likewise slotted, wherein mutually opposite pocket-side slots are in alignment with the slot of the insulation-displacement contact in the assembled state of the insulation-displacement contact. The joining contours integrally formed on the outside of the insulation-displacement contact allow the insulation-displacement contact to be seated in a fixed force-fitting and/or interlocking manner within the joining or receiving pocket, so that a reliable and/or additional force is preferably exerted by means of the limbs on the or each wire with which contact is made. The wires with which contact is to be made can already be placed in the slot regions of the insertion or receiving pocket when the insulation-displacement contact is pressed into said joining pocket of the additional part. As an alternative, the contact with which insulation-displacement contact has already been made by the two wires can also be inserted into the pocket.

The or each joining pocket is advantageously a constituent part of the (annular) frame part of the switching unit for circuit-related prespecified contact-connection of the contact wires, coil ends and/or phase connections for the stator or motor winding of the electric motor, in particular of a radiator fan motor of a motor vehicle.

In order to make contact with phase-side connections, three insulation-displacement contacts of this kind with associated joining or insertion pockets are provided in the frame part of the switching unit (interconnection or termination ring) and are arranged, for example, equidistantly from one another. The preferably ring-like frame part additionally suitably receives contact wires which are provided for interconnecting the coils of the stator winding and which are contact-connected to the respective coil ends and/or phase connections.

Other features which are considered as characteristic for the invention are set forth in the appended claims.

Although the invention is illustrated and described herein as embodied in an electric motor and switching unit therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 1A and 1B are diagrammatic, perspective views of an insulation-displacement contact with an insulation-displacement slot which is flanked by two insulation-displacement limbs, without or with a joining contour arranged on the outside of a limb of a slot opening, according to the invention;

DETAILED DESCRIPTION OF THE INVENTION

Figure 2:
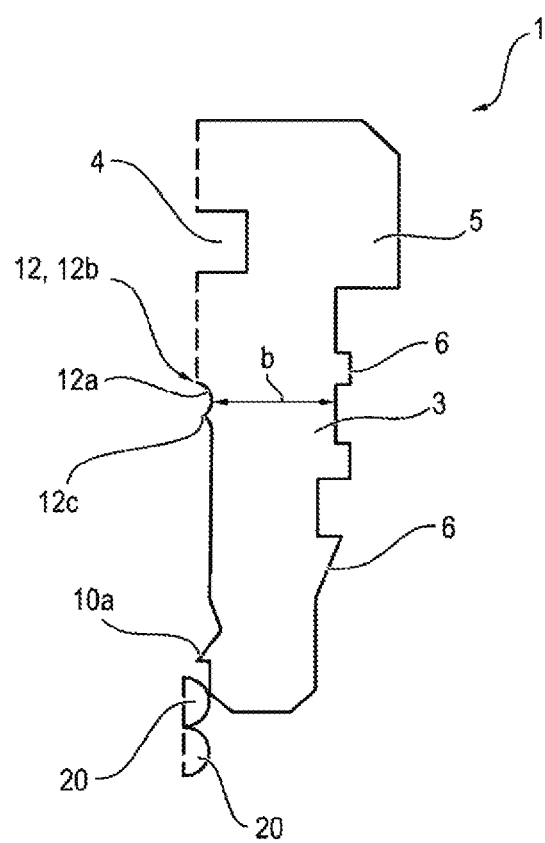
FIG. 2 is a front view of one of the insulation-displacement limbs of an insulation-displacement contact with a circular recess in the limb transition region, which circular recess produces a predetermined bending point.

Referring now to the figures of the drawings in detail and first, particularly to FIGS. 1A and 1B thereof, there is shown an insulation-displacement contact 1, simply called contact in the text which follows, with an insulation-displacement slot, simply called slot 2 in the text which follows, which is flanked by two insulation-displacement limbs, simply called limbs 3 in the text which follows, of the insulation-displacement contact 1, that is to say is located or formed between the two limbs 3. The contact 1 is preferably a stamped part. The limbs 3 of the contact 1 merge with a contact head 5 which is preferably provided with a passage opening (passage bore) 4. Joining contours 6 (grooves, pegs) are integrally formed or stamped into the outside of the limbs 3.

The slot 2 has a slot opening 7 in the region of the free ends of the limbs 3. A first, comparatively short insulation-displacement contour 9 adjoins the slot in the slot longitudinal direction 8. The insulation-displacement contour merges with a widened region 10 in the slot longitudinal direction 8. Said widened region is preferably diamond-shaped. A further, comparatively long insulation-displacement region, but at least a clamping region 11, adjoins the region 10 in turn. The insulation-displacement region ends at the ends which are situated opposite the limb free ends, that is to say at the transition region 12 of the limbs 3.

On account of these contact geometries, reliable contact connection of not only one wire, but rather of two or more wires, is possible. The wires are introduced or pressed into the slot 2 one after the other in the slot longitudinal direction 8 and in the process (azimuthally) cut on the circumference. In this case, the cut depth is greater than or equal to the thickness of an insulation (insulating sheathing) of the or each wire. To this end, the mutually facing limb edges of the limbs 3 are designed in the manner of blades as blade edges 13 in the region of the slot 2. The reduction in diameter of the first wire which is cut in the slot 2 is, for example, approximately 22%, while the reduction in diameter of the further wire which is cut in the slot 2 is, for example, approximately 16%, based on a copper wire with a diameter of, for example, 1.12 mm and a wire insulation of, for example, 0.003 mm, that is to say a total wire diameter of approximately 1.15 mm to 1.16 mm.

In the embodiment illustrated in FIG. 2 of the insulation-displacement contact 1, of which only the left-hand side insulation-displacement limb 3 is illustrated, the diamond-shaped region 10 has, on the side facing the slot opening 7, a tapering, comparatively pronounced cutting contour 10a. A recess contour 12a, which is round in the exemplary embodiment, is provided in or at the transition region 12 of the limbs 3. This leads to an at least slight reduction in the limb width b of the limbs 3 in comparison to the limb width of the insulation-displacement contacts 1 according to FIGS. 1A and 1B without a recess contour of this kind in the transition region 12.

This recess contour 12a defines a predetermined bending point 12b for the limbs 3 when the limbs bend outward as the wires or wire ends denoted 20 are introduced into the insulation-displacement slot 2 of the contact 1. In addition, the recess contour 12a forms an abutment edge 12c, for example in the form of a sector-like protrusion, which narrows the insulation-displacement slot 2 as a slot-internal stop for the wire ends 20.

Figure 3:
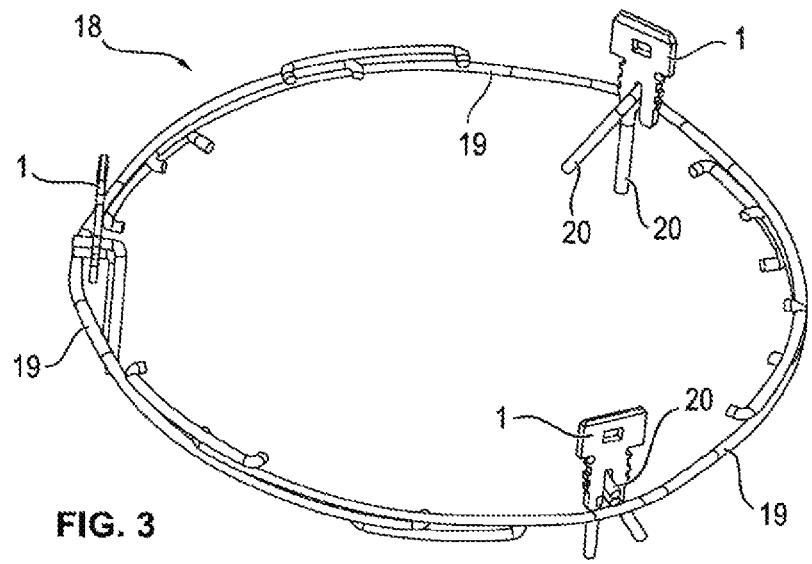
FIG. 3 is a perspective view of an interconnection ring with a plurality of contact wires which are arranged in a circle and three insulation-displacement contacts which are arranged equidistantly.

FIG. 3 shows an interconnection ring 18 with a plurality of contact wires 19 which are arranged in a circle and three insulation-displacement contacts 1 which are arranged equidistantly and with each of which two wires or wire ends 20 make insulation-displacement contact.

Figure 4:
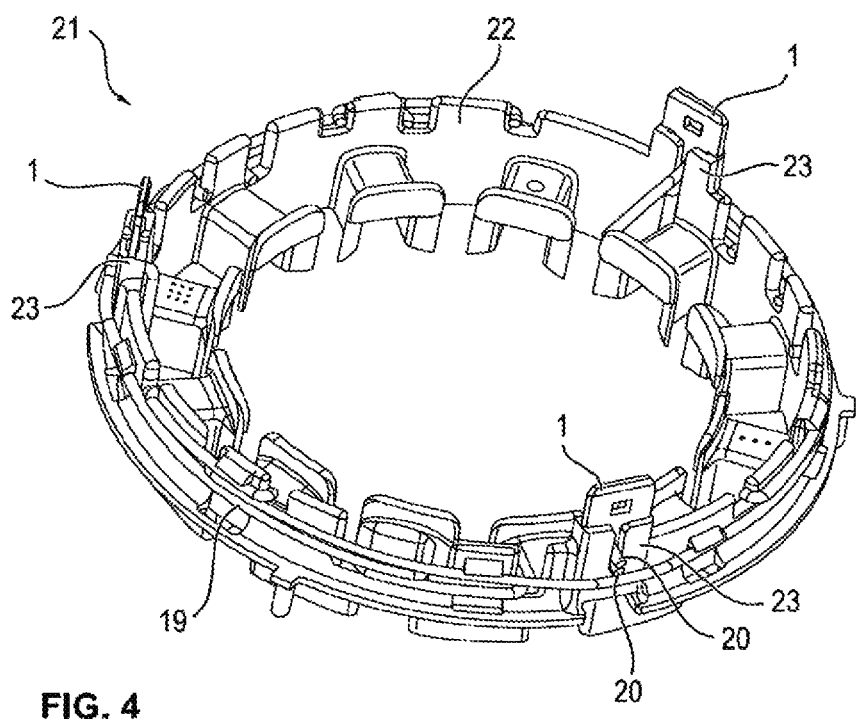
FIG. 4 is a perspective view, according to FIG. 3, of a switching unit with an interconnection ring of the kind and with an annular frame element.

FIG. 4 shows a switching unit 21 with an interconnection ring 18 of this kind. The switching unit 21 has an annular frame body (frame part) 22, preferably composed of plastic. The frame body in turn has, in the region of the respective insulation-displacement contact 1, a receiving pocket (insertion/joining pocket) 23 for receiving the insulation-displacement contact 1.

Figure 5:
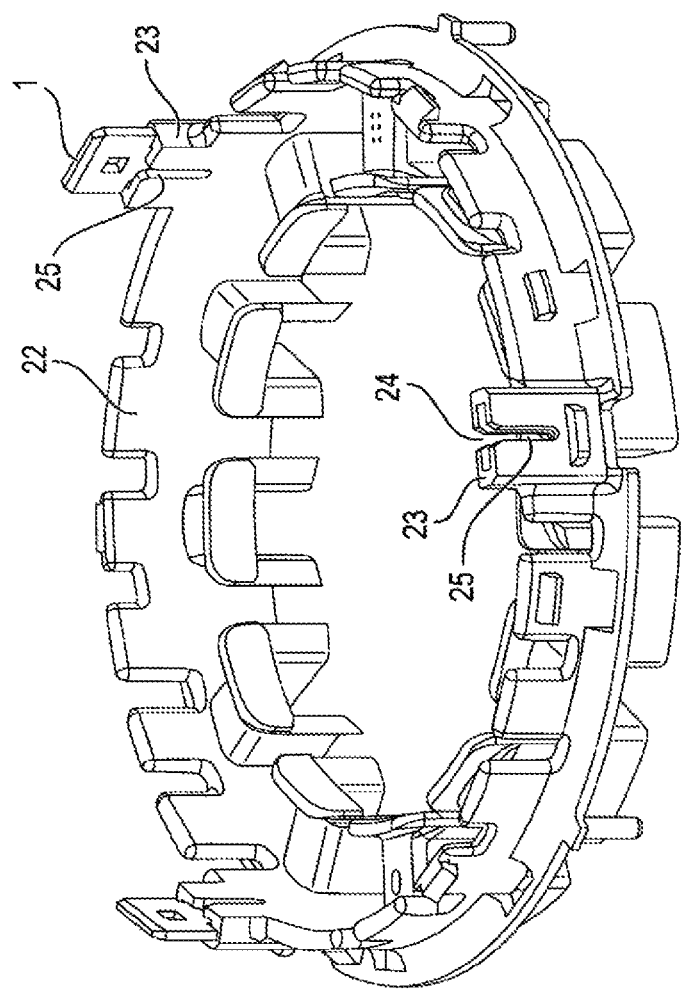
FIG. 5 is a perspective view of the switching unit according to FIG. 4 without the interconnection ring and with a view of an insertion pocket without an insulation-displacement contact inserted.

FIG. 5 shows the switching unit 21 or the frame part 22 according to FIG. 4 with two insulation-displacement contacts 1 inserted into the associated insertion pockets 23, while the insertion pocket 23 shown in the foreground of the figure is shown without an insulation-displacement contact 1. The slots 25 which are introduced into the insertion pockets 23 and are in turn provided with a slot opening 24 at the end side are in alignment with the slot 2 of the respective insulation-displacement contact 1. In this case, the respective frame-side slot opening 24 is located on that slot side which is situated opposite the slot opening 7 of the insulation-displacement contact 1, that is to say on the introduction or insertion side of the respective insertion pockets 23.

As shown in FIGS. 3 and 4, the wire ends 20 with which contact is made run normally to the slot plane spanned by the slot 2.

Figure 6:
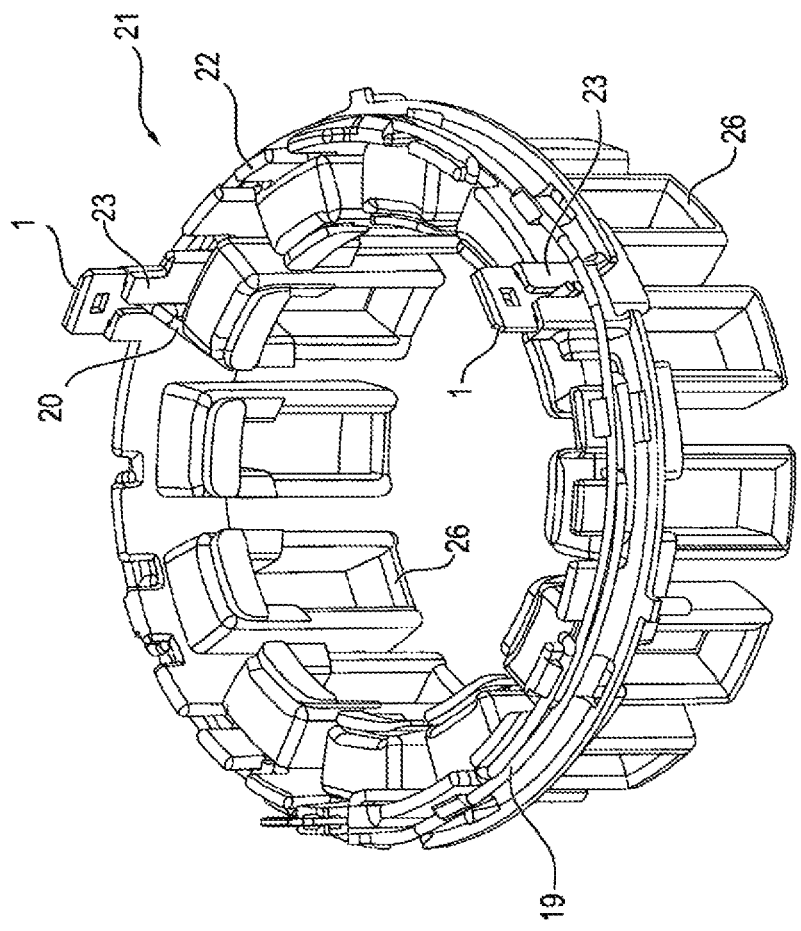
FIG. 6 is a perspective view, according to FIG. 5, of one embodiment of the switching unit with closed coil cassettes.

FIG. 6 shows a further embodiment of the switching unit with complete, closed coil cassettes 26 which are integrally formed on the frame part 22 of the switching unit 21. In the assembled state of the stator 27, shown in FIG. 7, of an electric motor 28, the coil cassettes receive the stator teeth of the stator and the individual coils of the stator winding are or will be wound around the coil cassette, in a manner not illustrated in any detail.

Figure 7:
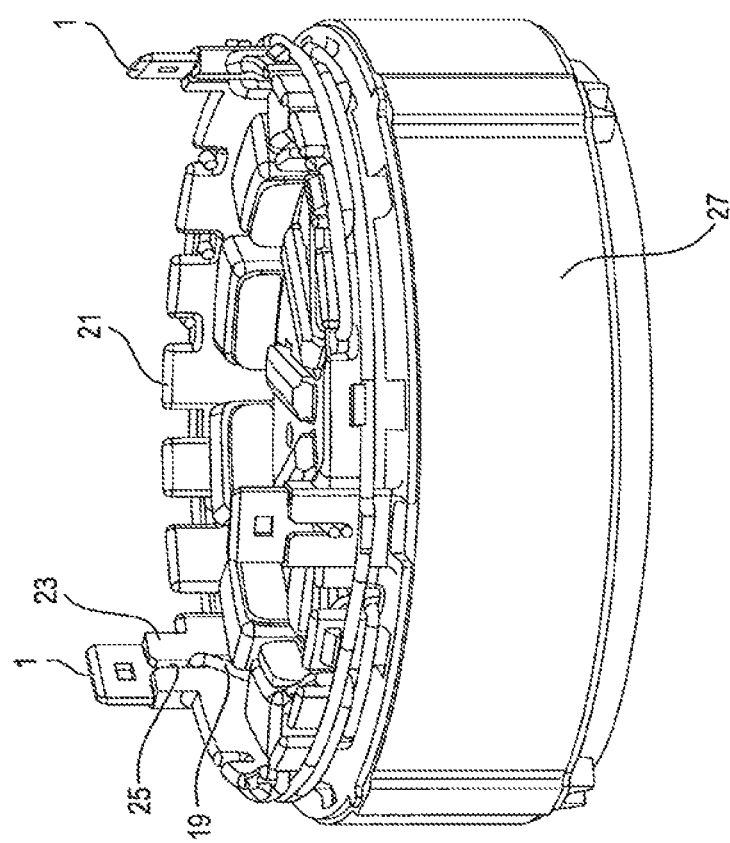
FIG. 7 is a perspective view of a stator with the switching unit fitted.
Figure 8:
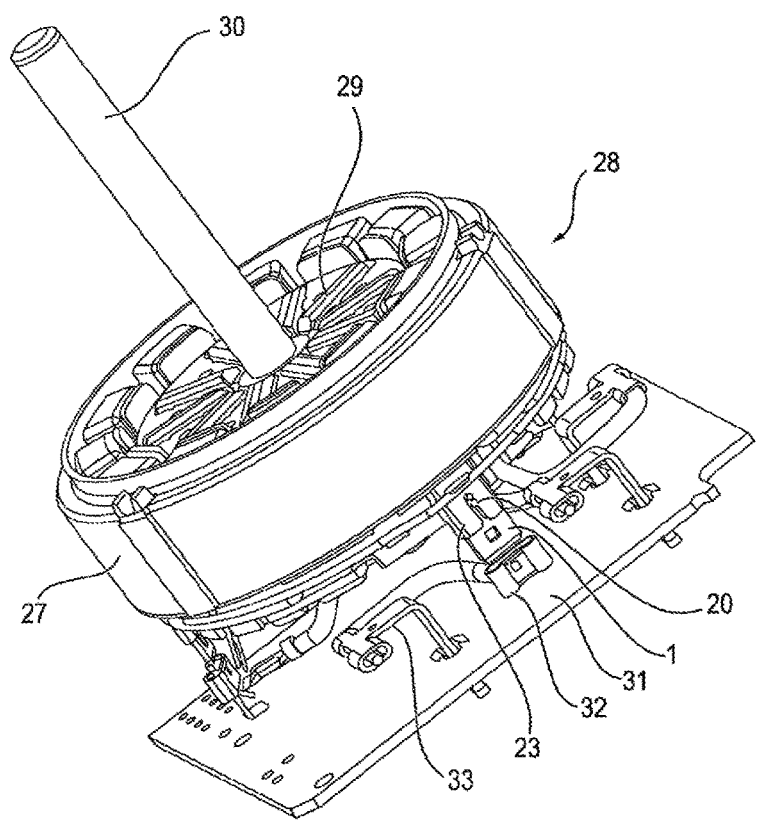
FIG. 8 is a perspective view of the stator with the switching unit fitted and the rotor and also the electronics system (printed circuit board) of an electric motor, the electronics system being connected to the insulation-displacement contacts.

FIG. 8 shows the stator 27, provided with the switching unit 21, according to FIG. 7, including the rotor 29 and motor shaft 30 and also including the electronics system (printed circuit board) 31 and the contact-connections between the electronics system and the insulation-displacement contacts 1 by the contact heads 5 of the insulation-displacement contacts. The contact heads are inserted into, for example crimped lug-like, insertion pockets 32 of contacts (flat contacts), which are produced as stamped and bent parts from flat wire, or contact sections 33 and in the process form the phase connections for three-phase current supply to the stator or motor winding.

Figure 9:
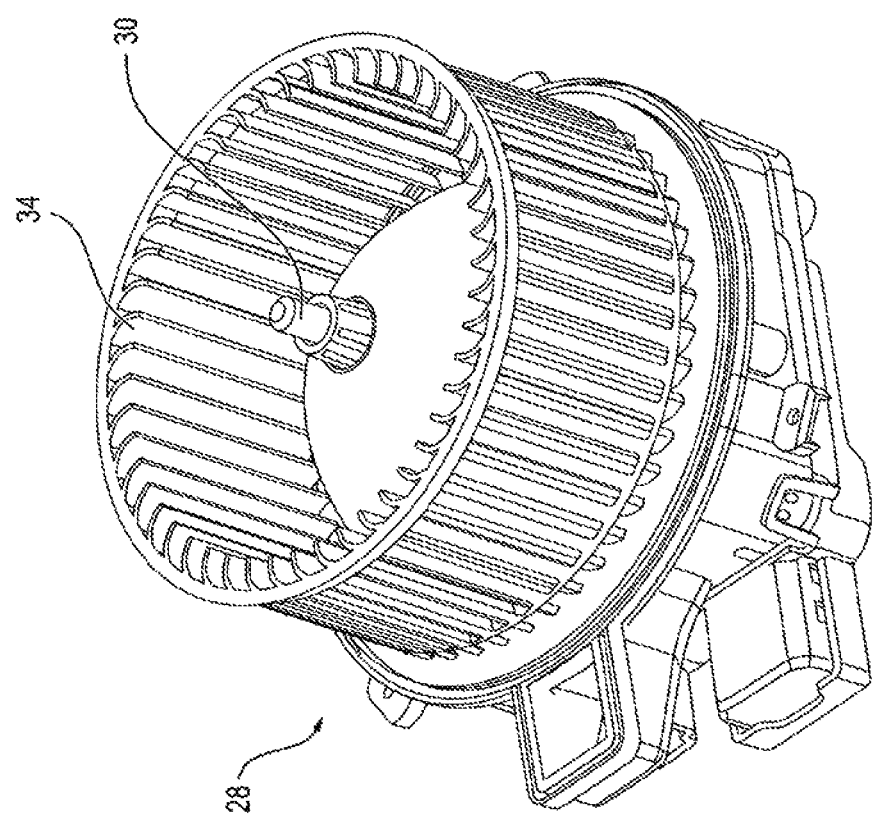
FIG. 9 is a perspective view of the electric motor as a radiator fan motor for motor vehicle, including the switching unit and the electronics system.

FIG. 9 shows the fitted or assembled electric motor 28 as a radiator fan motor for a motor vehicle, including the stator 27, switching unit 21 and fan impeller 34.

The following is a summary list of reference numerals and the corresponding structure used in the above description of the invention:

1 Insulation-displacement contact
2 Insulation-displacement slot
3 Insulation-displacement limb
4 Passage opening/bore
5 Contact head
6 Joining contour
7 Slot opening
8 Slot longitudinal direction
9 Insulation-displacement contour
10 Region
11 Insulation-displacement region
12 Transition region
12a Recess contour
12b Predetermined bending point
12c Abutment edge/stop
13 Blade edge
18 Interconnection ring
19 Contact wire
20 Wire/wire end
21 Switching unit
22 Frame part/body
23 Receiving/insertion/joining pocket
24 Slot opening
25 Slot
26 Coil cassette
27 Stator
28 Electric motor
29 Rotor
30 Motor shaft
31 Electronics system/printed circuit board
32 Insertion pocket
33 Contact/contact section
34 Fan impeller

The invention claimed is:

1. An electric motor, comprising:
a stator having a stator winding with coils;
a switching unit having a number of contact wires, an annular frame part, and phase connections with insulation-displacement contacts;
said contact wires interconnecting said coils of said stator winding and said annular frame part;
said contact wires disposed to form an interconnection ring for coil ends of said stator winding, said contact wires having wire ends connected to said insulation-displacement contacts;
each of said insulation-displacement contacts having two insulation-displacement limbs for connecting at least two of said wire ends and said two insulation-displacement limbs are spaced apart from one another so as to form an insulation-displacement slot and have limb-side blade edges;
said annular frame part of said switching unit having a number of insertion pockets, corresponding to a number of said insulation-displacement contacts, for receiving said insulation-displacement contacts;
said insulation-displacement slot and/or said insulation-displacement limbs of at least one of said insulation-displacement contacts is configured such that said at least two wire ends, which are introduced into said insulation-displacement slot one behind another in a slot longitudinal direction and are guided along said limb-side blade edges, are in reliable clamping contact;
said insulation-displacement slot of at least one of said insulation-displacement contacts having, in the slot longitudinal direction, a limb free end-side slot opening and a first slot region adjoining the limb free end-side slot opening, the first slot region, in the slot longitudinal direction, transitioning into a widened second slot region, and said widened second slot region transitioning into a third clamping and cutting region being narrower than said widened second slot region;

said widened second slot region receiving a first wire end cut first in said insulation-displacement slot, as soon as a second wire end enters into said first slot region adjoining the limb free end-side slot opening, said first and second wire ends, after being cut by said first slot region, residing in the third clamping and cutting region where the clamping contact is formed between the first and second wire ends and said third clamping and cutting region; and said insulation-displacement limbs disposed opposite one another at said limb-side blade edges.

2. The electric motor according to claim 1, wherein said insertion pockets of said annular frame part each have a slot formed therein which is in alignment with said insulation-displacement slot of one of said insulation-displacement contacts which is inserted into said insertion pockets.

3. The electric motor according to claim 1, wherein at least one of said insulation-displacement limbs of said insulation-displacement contacts has, on an outside of said one insulation-displacement limb, at least one raised joining contour.

4. The electric motor according to claim 1, wherein said second slot region is widened in a shape of a diamond or a rhombus.

5. An electric motor, comprising:
a stator having a stator winding with coils;
a switching unit having a number of contact wires, an annular frame part, and phase connections with insulation-displacement contacts;
said contact wires interconnecting said coils of said stator winding and said annular frame part;
said contact wires disposed to form an interconnection ring for coil ends of said stator winding, said contact wires having wire ends connected to said insulation-displacement contacts;
each of said insulation-displacement contacts having two insulation-displacement limbs for connecting at least two of said wire ends and said two insulation-displacement limbs are spaced apart from one another so as to form an insulation-displacement slot and have limb-side blade edges;
said annular frame part of said switching unit having a number of insertion pockets, corresponding to a number of said insulation-displacement contacts, for receiving said insulation-displacement contacts;

said insulation-displacement slot and/or said insulation-displacement limbs of at least one of said insulation-displacement contacts is configured such that said at least two wire ends, which are introduced into said insulation-displacement slot one behind another in a slot longitudinal direction and are guided along said limb-side blade edges there, are in reliable clamping contact;

said insulation-displacement slot of at least one of said insulation-displacement contacts having, in the slot longitudinal direction, a limb free end-side slot opening and a first slot region adjoining the limb free end-side slot opening and having an insulation-displacement contour, the first slot region, in the slot longitudinal direction, transitioning into a widened second slot region, and said widened second slot region transitioning into a third clamping and cutting region being narrower than said widened second slot region, said two wire ends, after being cut by said first slot region, residing in the third clamping and cutting region where the clamping contact is formed between the two wire ends and said third clamping and cutting region;

said insulation-displacement slot of at least one of said insulation-displacement contacts has a recess contour, which forms a predetermined bending point for one of said insulation-displacement limbs, in a slot end region which is averted from said limb free end-side slot opening in the slot longitudinal direction; and said recess contour, serving as said predetermined bending point, is circular shaped and forming an abutment contour, which narrows said insulation-displacement slot, as a stop for at least one of said wire ends.

6. The electric motor according to claim 5, wherein said insertion pockets of said annular frame part each have a slot formed therein which is in alignment with said insulation-displacement slot of one of said insulation-displacement contacts which is inserted into said insertion pockets.

7. The electric motor according to claim 5, wherein said second slot region is widened in a shape of a diamond or a rhombus.

8. The electric motor according to claim 5, wherein at least one of said insulation-displacement limbs of said insulation-displacement contacts has, on an outside of said one insulation-displacement limb, at least one raised joining contour.

* * * * *